United States Patent [19]
Nomoto et al.

[11] Patent Number: 5,408,414
[45] Date of Patent: Apr. 18, 1995

[54] TARGET ROUTE PREDICTING APPARATUS UTILIZING CHARACTERISTIC PARAMETERS OF TERRAIN INFORMATION

[75] Inventors: Kohei Nomoto; Yoshimasa Oh-Hashi, both of Kanagawa, Japan

[73] Assignee: Mitsubishi Denki Kabushiki Kaisha, Tokyo, Japan

[21] Appl. No.: 846,520

[22] Filed: Mar. 4, 1992

[30] Foreign Application Priority Data

Mar. 8, 1991 [JP] Japan .................................. 3-43272
Jun. 24, 1991 [JP] Japan ................................ 3-178663

[51] Int. Cl.$^6$ .......................................... G06F 15/50
[52] U.S. Cl. ..................... 364/449; 364/443; 364/460; 364/461; 342/451; 342/455
[58] Field of Search ............... 364/443, 444, 449, 460, 364/461; 340/436, 988, 990, 995; 73/178 R; 342/450, 451, 455, 457

[56] References Cited

U.S. PATENT DOCUMENTS

| | | | |
|---|---|---|---|
| 4,224,669 | 9/1980 | Brame .................. | 364/460 |
| 4,584,646 | 4/1986 | Chan et al. ........... | 364/449 |
| 4,646,244 | 2/1987 | Bateman et al. ..... | 364/461 |
| 4,829,304 | 5/1989 | Baird .................... | 364/449 |
| 4,939,663 | 7/1990 | Baird .................... | 364/443 |
| 4,951,214 | 8/1990 | Hollister .............. | 364/460 |
| 5,086,396 | 2/1992 | Waruszewski, Jr. . | 364/460 |
| 5,087,916 | 2/1992 | Metzdorff et al. ... | 364/449 |
| 5,128,874 | 7/1992 | Bhany et al. ......... | 364/461 |
| 5,283,575 | 2/1994 | Kao et al. ............ | 364/449 |

OTHER PUBLICATIONS

R. A. Singer et al. "Real-Time Tracking Filter and Selection for Tactical Applications", IEEE Trans., vol. AES-7, No. 1, (1971).

*Primary Examiner*—Gary Chin
*Attorney, Agent, or Firm*—Wolf, Greenfield & Sacks

[57] ABSTRACT

A route predicting apparatus for monitoring a flying target and predicting a route thereof. Even if the target is hidden by mountains or other obstacles thus preventing observation for a certain time, a reliable route prediction is carried out by utilizing the fact that a route of the target is restricted by geographical features. The apparatus comprises an observation unit for observing a target and outputting an observed value thereof, a terrain information unit for outputting characteristic parameters of stored terrain information, a prediction unit coupled to receive the observed value and the characteristic parameters of terrain information for performing a fuzzy inference to output a predicted observed value of the target, and a learning adjustment unit coupled to receive an error signal between a predicted observed value at the current time predicted a unit time before and a real observed value at the current time for adjusting the prediction unit by using a neural network.

9 Claims, 11 Drawing Sheets

Fig. 1
PRIOR ART

Fig. 2
PRIOR ART $\hat{x}$ (k+j+1/k)
j ≥ 1

$\hat{y}(k+j+1/k)$
$j \geq 1$

TARGET ROUTE PREDICTING APPARATUS UTILIZING CHARACTERISTIC PARAMETERS OF TERRAIN INFORMATION

BACKGROUND OF THE INVENTION

1. Field of the Invention

This invention relates to a route predicting apparatus, and more particularly to an apparatus adapted to monitor a movement of a flying target to predict a route of the target even when an observed value is temporarily not available due to obstacles such as mountains.

2. Description of the Prior Art

Conventionally, as a route predicting apparatus for such a target, a tracking filter for tracking a target has been used on the assumption that necessary information is obtainable at any time.

Figure 1:
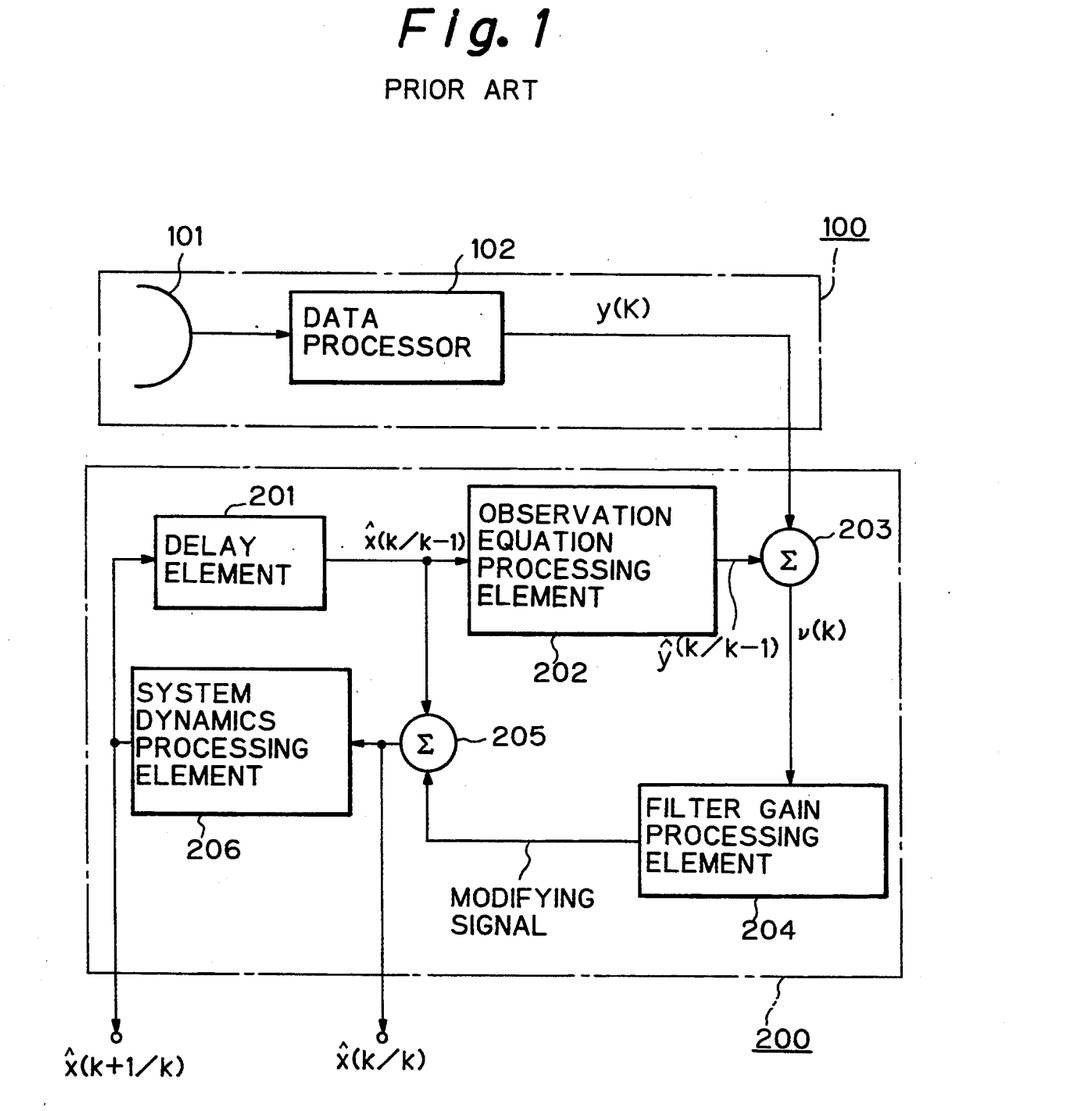
FIG. 1 is a block diagram illustrating the configuration of a conventional route predicting apparatus when a target is observable.

FIG. 1 is a schematic block diagram illustrating a tracking filter described in R. A. Singer and K. W. Behnke "Realtime tracking filter evaluation and selection for tactical applications", IEEE TRANS., VOL. AES7, NO. 1 (1971). The tracking filter provided by R. A. Singer utilized a Kalman filter and has been used as a model for subsequent tracking filters. In utilizing such a tracking filter for a route predicting apparatus, the configuration shown in FIG. 1 is used when a target is observable, while it is modified as shown in the block diagram shown in FIG. 2 when observation is impossible due to the target hidden behind mountains or some other obstruction.

First, the configuration of a conventional route predicting apparatus when a target is observable will be described with reference to FIG. 1. In FIG. 1, the route predicting apparatus comprises an observation unit 100 for observing a target and outputting an observed value $y(k)$ thereof, and a prediction unit 200 coupled to receive the observed value $y(k)$ for outputting signals $\hat{x}(k/k)$ and $\hat{x}(k+1/k)$ respectively indicative of an estimated state and a predicted state of the target. The observation unit 100 comprises a sensor (a radar or the like) 101 for observing a target and a data processor 102 for processing output signals from the sensor 101 to output the observed value $y(k)$. The prediction unit 200 comprises a delay element 201 coupled to receive the predicted state signal $\hat{x}(k+1/k)$ for delaying the signal $\hat{x}(k+1/k)$ by a unit time to output a predicted state signal $\hat{x}(k/k-1)$. It is noted that the word "state" means information which includes the above-mentioned observed value, which merely indicates a position of a target, supplemented with a speed and an accelerated speed of the target. On the other hand, the above-mentioned observed value merely indicates information of an observed position of the target. A portion k/k−1 in parenthesis in the predicted state signal indicates a predicted value of the state at a time k based on observed values which have been obtained by a time k−1. The prediction unit 200 further comprises an observation equation processing element 202 coupled to receive the predicted state signal $\hat{x}(k/k-1)$ for outputting a predicted observed value $\hat{y}(k/k-1)$, a first addition and subtraction element 203 for calculating a difference between the predicted observed value $\hat{y}(k/k-1)$ and the observed value $y(k)$ to generate a difference signal $v(k)$ which is referred to as an innovation process in the Kalman filter, a filter gain processing element 204 coupled to receive the innovation process $v(k)$ for outputting a modifying signal, a second addition and subtraction element 205 for calculating a sum signal $\hat{x}(k/k)$ of the modifying signal and the predicted state signal, where the sum $\hat{x}(k/k)$ indicates an estimated state, and a system dynamics processing element 206 coupled to receive the estimated state signal for outputting a signal $\hat{x}(k+1/k)$ indicating a predicted state a unit time later, the predicted state signal being again input to the delay element 201 for use in processing which will be performed a unit time later.

Figure 2:
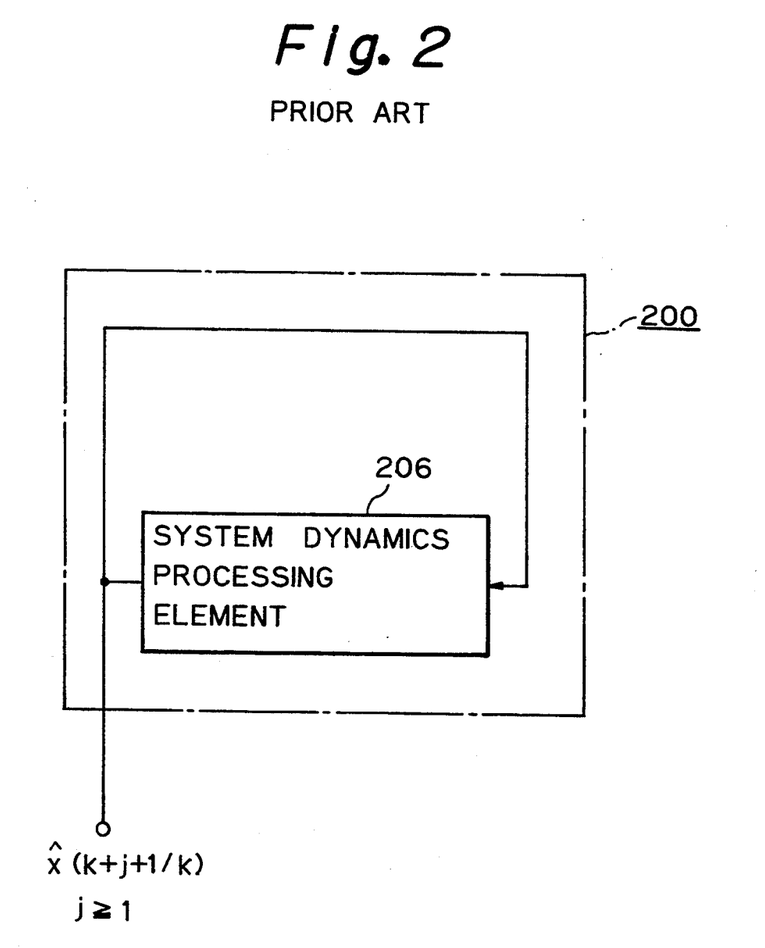
FIG. 2 is a block diagram illustrating the configuration of the conventional route predicting apparatus when a target is not observable.

FIG. 2 illustrates the configuration of the conventional route predicting apparatus when a target is not observable. Since no observed value is available, the prediction unit 200 only comprises the system dynamics processing element 206. In this configuration, the system dynamics processing element 206 is repetitively supplied with predicted state signals and extrapolates the predicted states. In FIG. 2, a portion "k+j+1/k" in parenthesis in the predicted state signal indicates a predicted value of the state at a time k+j+1 based on the observed values which have been obtained until the time k, "j" being incremented by one.

Figure 3:
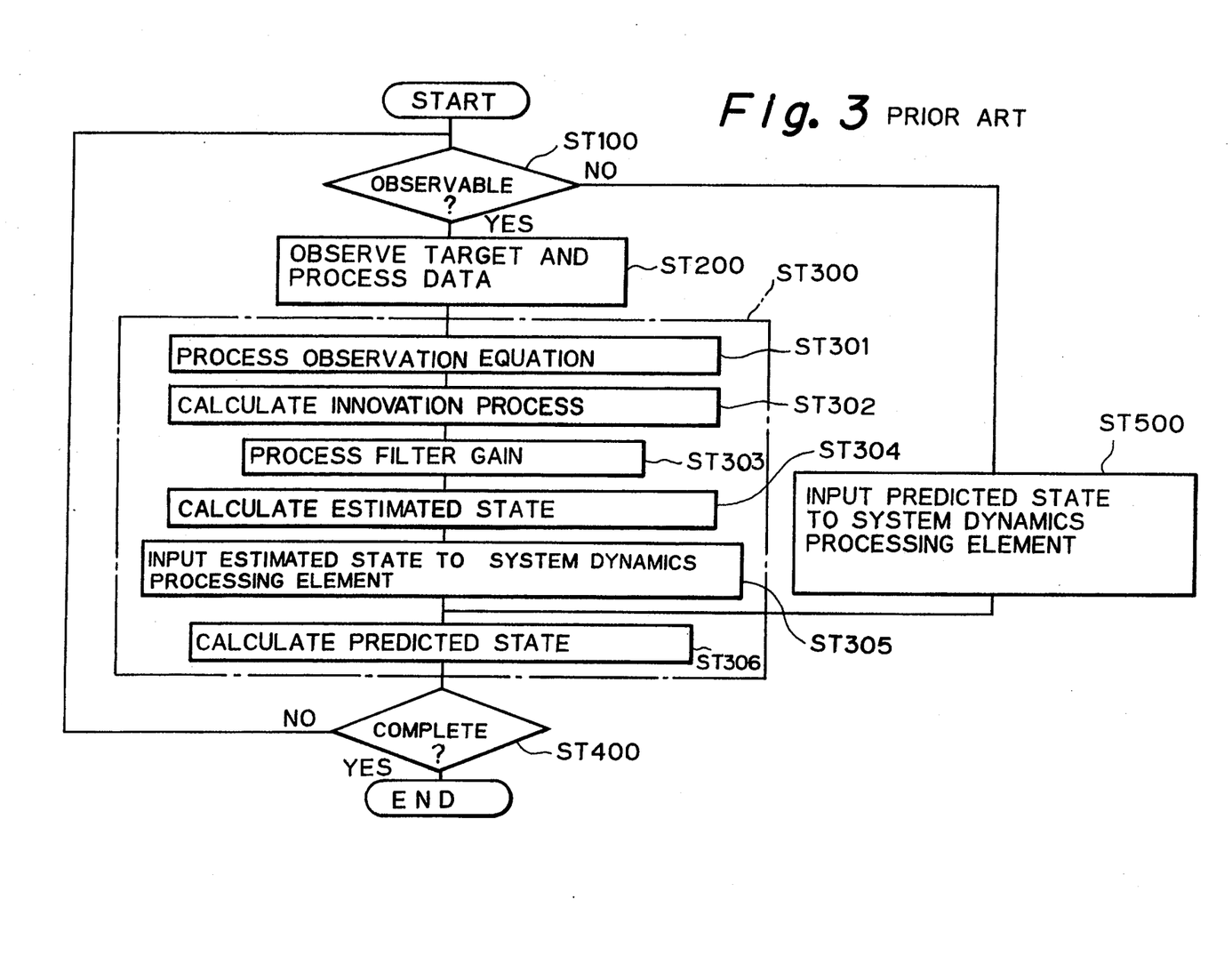
FIG. 3 is a flowchart illustrating the operation of the route predicting apparatus shown in FIGS. 1 and 2.

The operation of the above-mentioned prior art example will be described with reference to a flowchart of FIG. 3. First, at steps ST100 the data processor 102 determines whether or not a target is observable. If it is observable, the processing flow proceeds to step ST200 where the sensor observes the target, and the data processor 102 processes data output from the sensor 101 to output an observed value $y(k)$. The configuration of the route predicting apparatus in this event is represented by the block diagram of FIG. 1. Then, a series of operations is performed in step ST300 for generating an estimated state and a predicted state of the target from the observed value $y(k)$ in accordance with the Kalman filter. A series of equations relative to the Kalman filter is as follows:

$$\hat{x}(k/k) = \hat{x}(k/k-1) + K(k)[y(k) - H\hat{x}(k/k-1)] \quad (1)$$

$$K(k) = P(k/k-1)H^T[HP(k/k-1)H^T + R]^{-1} \quad (2)$$

$$P(k/k) = [I - K(k)H]P(k/k-1) \quad (3)$$

$$\hat{x}(k+1/k) = \Phi\hat{x}(k/k) \quad (4)$$

$$P(k+1/k) = \Phi P(k/k)\Phi^T + Q \quad (5)$$

where
- $x(k)$: a state of the target at a time k;
- $\hat{x}(i/j)$: a predicted state or an estimated state of $x(i)$ at a time j;
- $\hat{p}(i/j)$: a covariance matrix of $\hat{x}(i/j)$;
- $K(k)$: a gain at the time k;
- $\Phi$, $H$, $I$: a transition matrix, an observation matrix, and a unit matrix.
- $Q$, $R$: covariance matrices of system noise and observation noise At step ST301, the observation equation processing element 202 is supplied with a predicted state signal $\hat{x}(k/k-1)$ at the present time obtained from the delay element 201, and calculates and outputs a value of the second term in the blanket [] of the equation (1). This processing is performed to fetch information relating to the position of the target from the predicted values representing the position and speed of the target. This value will be referred to as a predicted observed value ŷ(k/k−1). Next, at step ST302, the addition and subtraction element 203 receives the predicted observed value ŷ(k/k−1) and the observed value y(k), and calculates and outputs a value of the term in the blanket [] of the equation (1). This value is referred to as an innovation process v(k) in the Kalman filter. Further, at step ST303 the filter gain processing element 204 calculates an optimal filter gain in accordance with the equations (2), (3) and (5), and calculates and outputs a value of the second term on the right side of the equation (1). This value acts as a modifying signal. Then, at step ST304, the addition and subtraction element 205 receives the modifying signal and the predicted state signal x̂(k/k−1), and calculates and outputs a value of x̂(k/k) of the equation (1) representing an estimated state. At step ST305, the estimated state x̂(k/k) is input to the system dynamics processing element 206. The processing flow proceeds to step ST306 where the system dynamics processing element 206 receives the estimated state signal x̂(k/k), calculates the equation (4), and outputs a signal indicative of a predicted state a unit time later. The estimated state signal and the predicted state signal are the outputs of the route predicting apparatus. Finally at step ST400, it is determined whether the operation has been completed or not. If the operation has not been completed, the processing flow again returns to step ST100 a unit time later and the same processing is repeated. In this event, at step ST306 a predicted state value predicting a state a unit time later from the current time is used a unit time later as a value indicative of a predicted state at the current time obtained from a predicted value a unit time before. Such a time shift is achieved by the delay element 201 in the block diagram of FIG. 1.

On the other hand, if it is determined at step ST100 that observation is impossible, the processing flow proceeds to step ST500 where the predicted state signal is input to the system dynamics processing element 206. The configuration of the route predicting apparatus in this event is represented by the block diagram of FIG. 2. At step ST306, the system dynamics processing element 206 repetitively receives the predicted state signals in place of the estimated state signal and performs calculations for extrapolating the predicted states. The predicted state signal is an output of the route predicting apparatus. The equation for calculating this predicted state signal is expressed as follows:

$$\hat{x}(k+j+1/k) = \Phi \hat{x}(k+j/k) \qquad (6)$$

The conventional route predicting apparatus, constructed such as described above, can maintain route prediction by extrapolating predicted states if observation of a target is temporarily impossible. However, if such a condition persists, predicted values are repetitively made based on previous assumed values, thereby causing a problem that reliability in route prediction is reduced.

SUMMARY OF THE INVENTION

This invention has been made to solve such problems as described above, and an object of the invention is to provide a route predicting apparatus which is capable of performing highly reliable route prediction even if observation of, for example, a low flying targets is impossible due to geographical features for a long period of time, by employing terrain information.

To achieve the above object, a target route predicting apparatus according to one aspect of the present invention comprises:
observing means for outputting a route value representative of a route of a target;
terrain information means for outputting characteristic parameters of prestored terrain information; and
predicting means coupled to receive the route value and the characteristic parameters for predicting a route of the target when the target is observable, and coupled to receive the characteristic parameters and a predicted route successively for extrapolating the route when the target is not observable.

The predicting means may comprise,
(I) when the target is observable:
first inferring means coupled to receive the route value, the characteristic parameters and a first predicted route value representing a predicted route of the target at the current time and which has been predicted a unit time prior to the current time for outputting a second predicted route value of the target a unit time later than the current time; and
delay means for delaying the second predicted route value by a unit time to output the first predicted route value; and
(II) when the target is not observable:
second inferring means coupled to successively receive the characteristic parameters and a predicted route value at intervals of unit time for outputting a predicted route value of the target a unit time later from each time.

The apparatus may further comprise:
subtracting means coupled to receive the first predicted route value and the route value for outputting an error signal indicative of a difference therebetween; and
learning means coupled to receive the error signal for learning route prediction to adjust the first inferring means so as to compensate for the error signal.

The terrain information means may include a memory for prestoring terrain information and an extracting means for extracting characteristic parameters of terrain information from the memory.

A target route predicting apparatus according to another aspect of the present invention comprises:
observing means for observing a target to output an observed value representative of a route of the target;
memory means for prestoring terrain information;
calculating means responsive to the terrain information from the memory means and an estimated state of the target for calculating a steering amount of the target; and
predicting means responsive to the observed value from the observing means and the steering amount from the calculating means for outputting a signal representative of an estimated state of the target and a signal representative of a predicted state of the target, the signal representing the estimated state of the target being fed to the calculating means.

The predicting means may comprise:
means responsive to the signal representing the predicted state of the target for outputting a predicted observed value;
means responsive to the observed value and the predicted observed value for outputting the signal representative of the estimated state of the target; and means responsive to the signal representative of the estimated state of the target for outputting the signal representative of the predicted state.

A target route predicting apparatus according to further aspect of the present invention comprises:

memory means for prestoring terrain information;

calculating means responsive to the terrain information from the memory means and a predicted state of the target for calculating a steering amount of the target; and predicting means responsive to the steering amount from the calculating means for outputting a signal representative of a predicted state of the target, the signal representative of the predicted state of the target being fed to the calculating means.

A target route predicting apparatus according to still another aspect of the present invention comprises:

observing means for observing a target to output an observed value representative of a route of the target;

memory means for prestoring terrain information;

first predicting means responsive to the terrain information from the memory means and an estimated current state of the target for outputting a maneuver signal representative of a maneuver taken by the target for the purpose of avoiding collision to an obstacle; and second predicting means responsive to the observed value from the observing means and the maneuver signal from the first predicting means for outputting a signal representative of an estimated state of the target and a signal representative of a predicted state of the target, the signal representative of the estimated state of the target being fed to the first predicting means.

The second predicting means may comprise:

means responsive to the signal representative of the predicted state of the target for outputting a predicted observed value;

means responsive to the observed value and the predicted observed value for outputting the signal representative of the estimated state of the target; and means responsive to the signal representative of the estimated state of the target for outputting the signal representative of the predicted state.

The above and other objects and advantages of the invention will become more apparent from the following detailed explanation with reference to the accompanying drawings.

BRIEF DESCRIPTION OF THE DRAWINGS

Throughout this specification, like reference numerals and symbols refer to like components.

DESCRIPTION OF PREFERRED EMBODIMENTS

Figure 4:
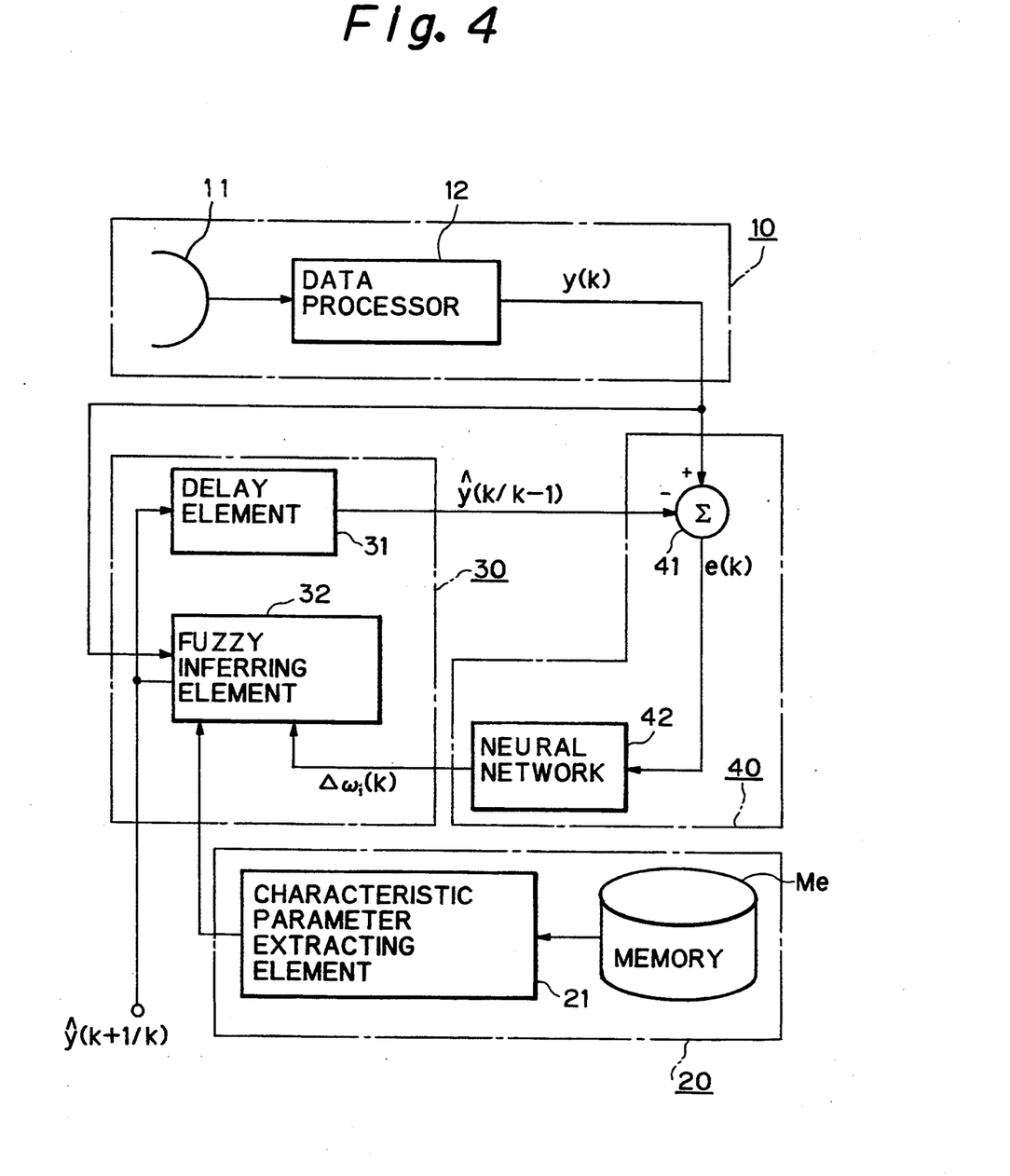
FIG. 4 is a block diagram illustrating the configuration of the first embodiment of a route predicting apparatus according to the present invention when a target is observable.
Figure 5:
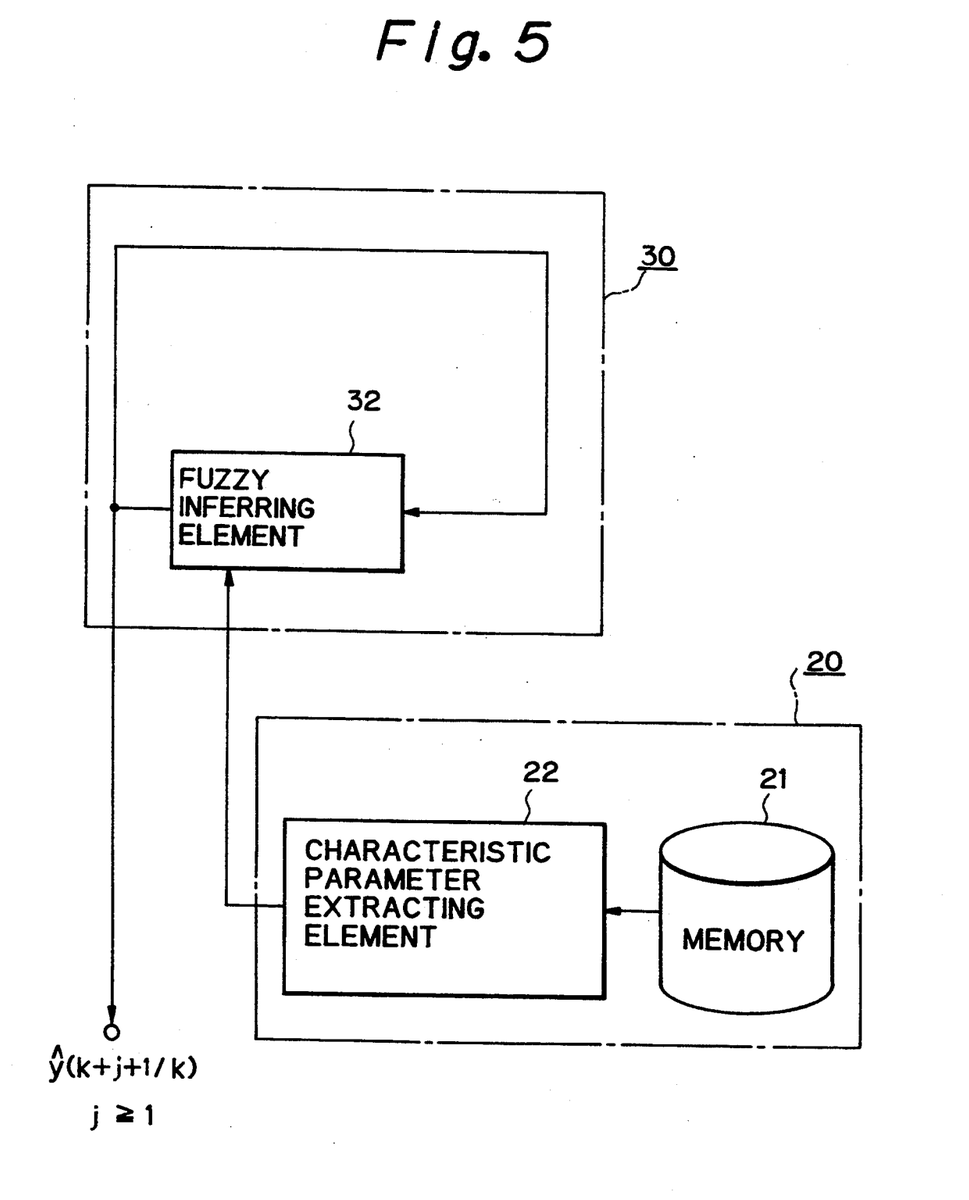
FIG. 5 is a block diagram illustrating the configuration of the route predicting apparatus of FIG. 4 when a target is not observable.

FIGS. 4 and 5 illustrate the first embodiment of a target route predicting apparatus according to the invention. FIG. 4 shows the configuration of the apparatus when a target is observable. In FIG. 4, the route predicting apparatus comprises an observation unit 10 for observing a target and outputting an observed value $y(k)$ of the target, a terrain information unit 20 for outputting characteristic parameters of terrain information prestored therein, a prediction unit 30 coupled to receive the observed value $y(k)$ and the characteristic parameters of the terrain information and output a predicted observed value $\hat{y}(k+1/k)$ of the target, and a learning adjustment unit 40 for generating an error signal $e(k)$ between a predicted observed value $\hat{y}(k/k-1)$ indicating a value of the current time predicted a unit time prior to the current time and an observed value $y(k)$ of the current time and outputting an adjusting signal $\Delta\omega_i(k)$ to the prediction unit 30.

The observation unit 10 includes a sensor (a radar or the like) for observing a target and a data processor 12 for processing signals output from the sensor 11 and outputting an observed value $y(k)$.

The learning adjustment unit 40 comprises an addition and subtraction element 41 for calculating a difference between the predicted observed value $\hat{y}(k/k-1)$ indicating a value of the current time predicted a unit time prior to the current time and the observed value $y(k)$ of the current time and generating the error signal $e(k)$ representing the difference which is referred to as an error signal, and a neural network 42 coupled to receive the error signal $e(k)$ for outputting the adjusting signal $\Delta\omega_i(k)$.

The prediction unit 30 comprises a fuzzy inferring element 32 coupled to receive the observed value $y(k)$ and the characteristic parameters of terrain information for outputting a predicted observed value $\hat{y}(k+1/k)$ indicating a value at a unit time later. The fuzzy inferring element 32 is adjusted by the adjusting signal so as to gradually correct the predicted observed value. The prediction unit 30 further comprises a delay element 31 coupled to receive the predicted observed value $\hat{y}(k+1/k)$ for outputting the predicted observed value $\hat{y}(k/k-1)$ delayed by a unit time.

The terrain information unit 20 comprises a memory Me which has previously been loaded with terrain information and outputs the terrain information and a characteristic parameter extracting element 21 coupled to the memory to extract characteristic parameters used for route prediction and output the characteristic parameters of the terrain information to the fuzzy inferring element 32.

FIG. 5 illustrates the configuration which the route predicting apparatus of FIG. 4 may take in the case where the target is not observable. As can be seen from FIG. 5, the prediction unit 30 only comprises the fuzzy inferring element 32 since no observed value is available. The fuzzy inferring element 32 repetitively receives a predicted observed value as well as characteristic parameters of the terrain information and successively extrapolates and outputs predicted observed values $\hat{y}(k+j+1/k)$ as long as the target is not observable.

Figure 6:
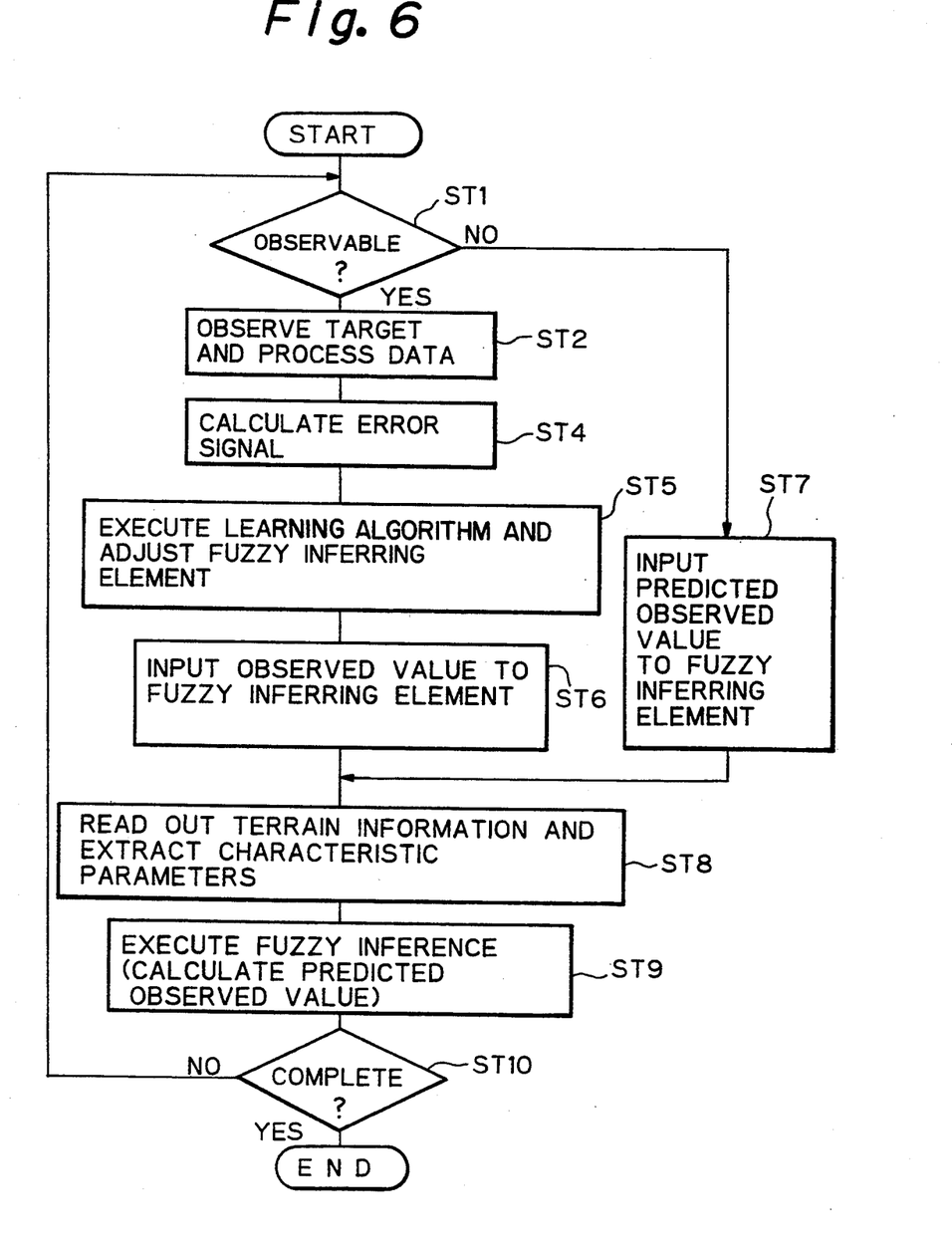
FIG. 6 is a flowchart illustrating the operation of the target route predicting apparatus shown in FIGS. 4 and 5.

The operation of the above described route predicting apparatus according to the invention will now be described with reference to a flowchart of FIG. 6. First, the data processor 12 determines at step ST1 whether a target is observable or not. If observable, the processing flow proceeds to step ST2 where the target is observed by the sensor 11, and the data processor 12 processes data output from the sensor 11 to output an observed value y(k). In this event, the configuration of the route predicting apparatus is represented by the block diagram of FIG. 4. Next, at step ST4, the addition and subtraction element 41 receives a predicted observed value $\hat{y}(k/k-1)$ indicating a value of the current time predicted a unit time prior to the current time and an observed value y(k) of the current time and outputs an error signal e(k) therebetween. Then, at step ST5, the neural network 42 executes a learning algorithm for adjusting the fuzzy inferring element 32 such as will be later described. The learning of the neural network 42 is executed on the basis of a series of the following equations:

$$E(k) = \frac{1}{2}[y(k) - \hat{y}(k/(k-1)]^2 = \frac{1}{2}e(k)^2 \quad (7)$$

$$\frac{\partial E(k)}{\partial \omega_i(k-1)} = \frac{\partial E(k)}{\partial \hat{y}(k/k-1)} \cdot \frac{\partial \hat{y}(k/k-1)}{\partial \omega_i(k-1)} \quad (8)$$

$$= -\frac{e(k)\mu_i(k-1)}{\sum_{i=1}^{n} \mu_i(k-1)} \quad (9)$$

$$\Delta\omega_i(k) = -\frac{\eta}{\sum_{i=1}^{n} \mu_i(k-1)} \cdot e(k) \cdot \mu_i(k-1) \quad (10)$$

$$\omega_i(k) = \omega_i(k-1) + \Delta\omega_i(k) \quad (11)$$

where
y(t): an observed value;
$\hat{y}(i/j)$: a predicted observed value of y(i) at a time j;
$\eta$: a learning coefficient;
$\Delta\omega_i(k)$: an adjusting signal; and
$\omega_i(k)$ and $\mu_i(k)$ will be later described.

The equation (7) defines a square error, and the equation (8) is used to calculate the direction in which the square error can be reduced. A conversion from the equation (8) to the equation (9) will be later explained in connection with the operation of the fuzzy inferring element 32. The equation (10) is used to calculate the adjusting signal $\Delta\omega_i(k)$. However, an actual adjustment is executed in accordance with the equation (11). At step ST6, the predicted observed value $\hat{y}(k/k-1)$ is supplied to one input of the fuzzy inferring element 32. Then, the processing flow proceeds to step ST8 where the characteristic parameter extracting element 21 extracts characteristic parameters from the terrain information read out of the terrain information memory Me and supplies the extracted parameters to the other input of the fuzzy inferring element 32. The terrain information includes, for example, a height above sea level at each square portion on a ground surface. Examples of the characteristic parameters are the altitude of the target, the angle of a mountain or a valley with respect to the direction of flight of the target. At step ST9, the fuzzy inferring element 32 executes fuzzy inference to calculate the predicted observed value $\hat{y}(k+1/k)$ of a unit time later. The fuzzy inference is executed on the basis of a series of the following equations:

the i-th rule (i = 1, 2 . . . , m)
If $[x_1(k)$ is $A_{i1})$ and . . . and $(x_n(k)$ is $A_{in})]$
Then $[\hat{y}(k+1/k)$ is $\omega_i(k)](12)$ $$\mu_i(k) = \prod_{j=1}^{n} A_{ij}(x_j(k)) \quad (13)$$

$$y(k+1/k) = \frac{\sum_{i=1}^{m} \mu_i(k)\omega_i(k)}{\sum_{i=1}^{m} \mu_i(k)} \quad (14)$$

$x_j(k)$: an input of the fuzzy inference derived from the observed value y(k) and the characteristic parameters of the terrain information;
$A_{ij}(\cdot)$: a fuzzy label for the j-th input of the i-th rule, as well as a membership function thereof;
$\omega_i(k)$: a value of a predicted state by the i-th rule; and
$\mu_i(k)$: a degree of establishment of the i-th rule.

The equation (12) indicates the i-th rule consists of an If part and a Then part. The If part further comprises a number n of conditions coupled by "and", and this "and" connection is defined by a product. Therefore, the degree of establishment of each rule is calculated by the equation (13). These rules are summed by a weighting calculation of the equation (14) to determine a predicted observed value. The predicted observed value is a resultant value output from the fuzzy inferring element 32 and accordingly becomes the final output of the route predicting apparatus of the invention. A conversion from the equation (8) to the equation (9) will be apparent from the equations (7) and (14). Finally, it is determined at step ST10 whether or not the operation has been completed. If it has not been completed, the processing flow again returns to step ST1 a unit time later to repeat the same operation. The delay element 31 shown in FIG. 4 serves to shift an input signal by the same time as described in connection with the operation of the conventional apparatus shown in FIG. 1.

On the other hand, if the data processor 12 determines at step ST1 that a target is not observable, the processing flow proceeds to step ST7 where the above-mentioned predicted observed value $\hat{y}(k+j+1/k)$ is supplied to the input of the fuzzy inferring element 32. In this event, the route predicting apparatus of the invention is constructed as represented by the block diagram of FIG. 5. At step ST8, the fuzzy inferring element 32 repetitively receives the predicted observed value $\hat{y}(k+j+1/k)$ in place of the predicted observed value $\hat{y}(k/k-1)$ to extrapolate the predicted observed values. The predicted observed values are the output of the route predicting apparatus of the invention. The extrapolation is carried out by the following equation:

the i-th rule (i=1, 2 ... m)
(j>1)
If $[x_1(k+j)$ is $A_{i1})$ and ... and $(x_n(k+j)$ is $A_{in})]$
Then $[\hat{y}(k+j+1)$ is $\omega_i(k)$ ](15)

$$\mu_i(k+j) = \prod_{j=1}^{n} A_{ij}(x_j(k+j)) \quad (16)$$

$$\hat{y}(k+j+1/k) = \frac{\sum_{i=1}^{m} \mu_i(k+j)\omega_i(k+j)}{\sum_{i=1}^{n} \mu_i(k+j)} \quad (17)$$

As described above, since a route predicting apparatus of the invention is provided with a terrain information unit for storing terrain information and outputting characteristic parameters thereof, even if observation of a target is impossible for a long period of time, reliable route prediction can be achieved by utilizing the fact that a route of the target flying at a low altitude is restricted by geographical features.

Also, as the apparatus is further provided with a learning adjustment unit for learning route prediction of a target and adjusting a prediction unit when the target is observable, even if a correct route cannot be initially predicted, accuracy in route prediction gradually increases.

Figure 7:
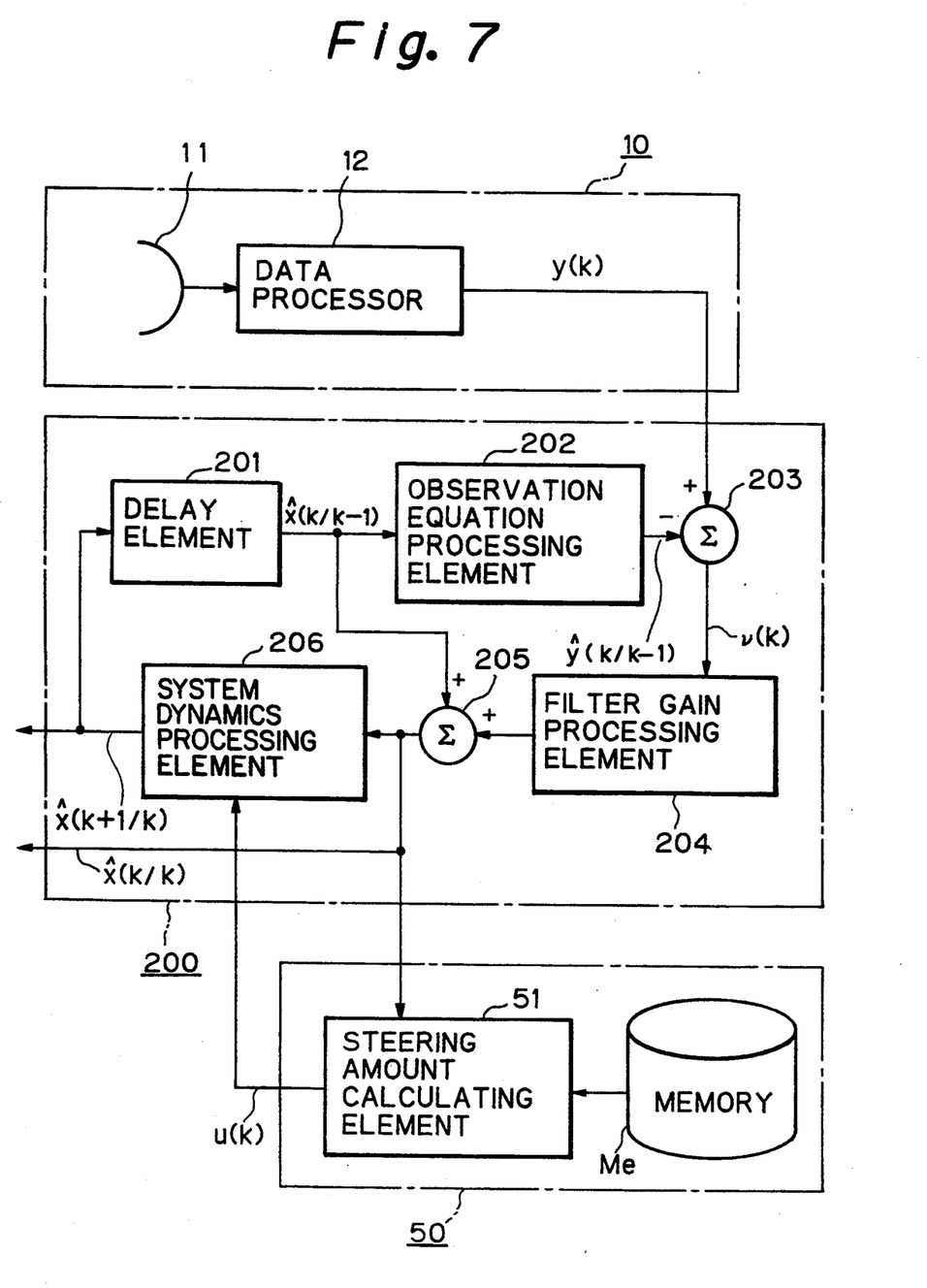
FIG. 7 is a block diagram illustrating the construction of the second embodiment of a target route predicting apparatus according to the present invention.

Referring to FIG. 7, there is shown the construction of the second embodiment of a target route predicting apparatus according to the present invention. This second embodiment of the present invention includes, as a new structural component, a steering amount calculating unit 50 comprising memory Me which stores terrain information and a steering amount calculating element 51 which receives the terrain information from memory Me and estimated state signal x(k/k) and calculates and outputs a steering amount u(k) which the target in the estimated current state is forced to generate by a restriction of terrain.

Prediction unit 200 receives observed value y(k) from observing unit 10 and a signal representative of steering amount u(k) from steering amount calculating element 51 and calculates and outputs estimated state signal $\hat{x}(k/k)$ and predicted state signal $\hat{x}(k+1/k)$. System dynamics processing element 206 in predicting unit 200 receives estimated state signal $\hat{x}(k/k)$ from addition and subtraction element 205 and steering amount u(k) and outputs predicted state signal $\hat{x}(k+1/k)$ representative of a predicted state at a unit time after a current time. Signal $\hat{x}(k+1/k)$ is supplied to delay element 201 for being used in processing which will be performed a unit time later.

Figure 8:
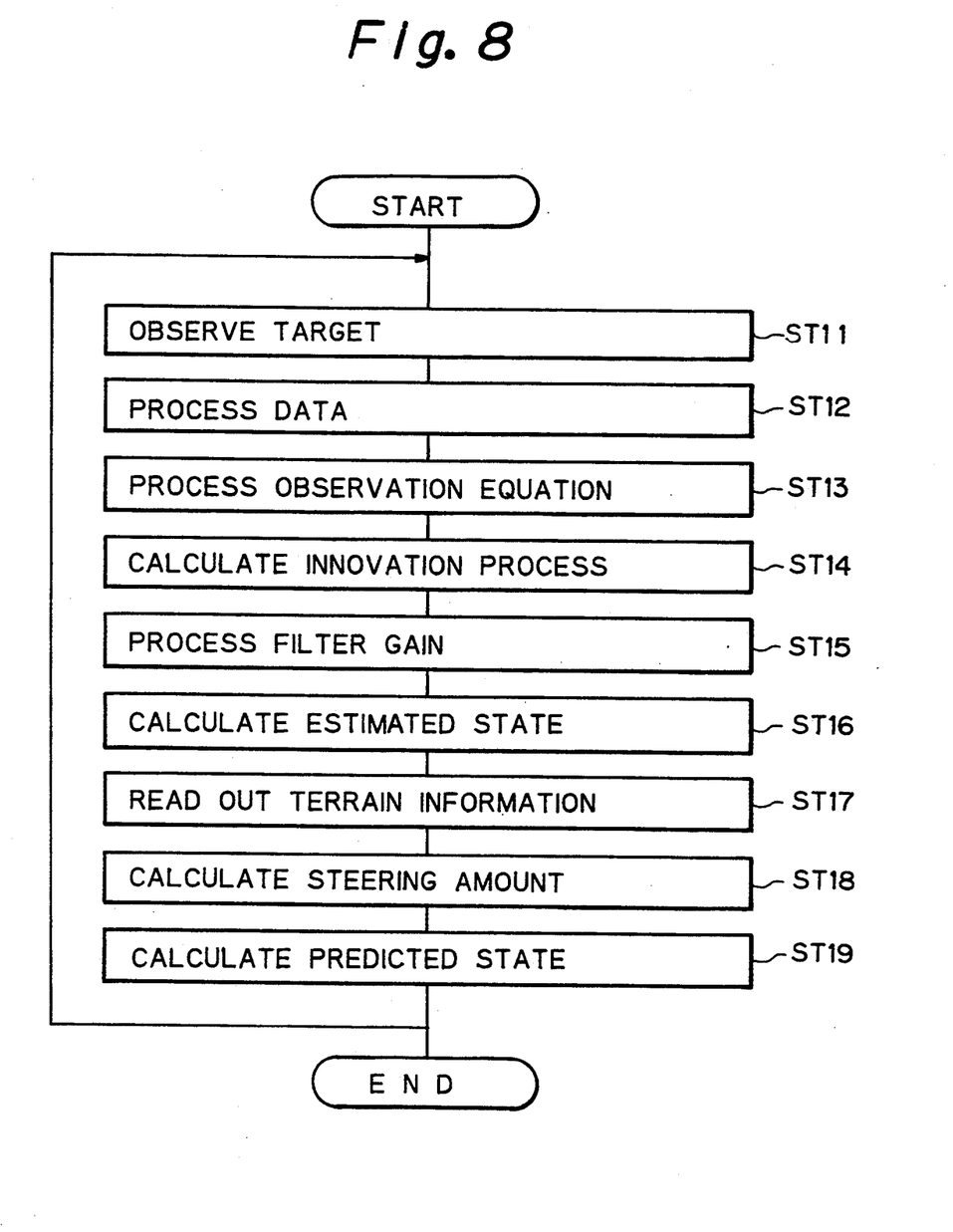
FIG. 8 is a flowchart illustrating the operation of the target route predicting apparatus shown in FIG. 7.

Operation of the target route predicting apparatus will be described using a flowchart shown in FIG. 8. In steps ST11–ST16, the operations similar to those in steps ST100, ST200 and ST301–ST304 shown in FIG. 3 are performed. Subsequently, in a step ST17, the terrain information is read out of memory Me. In a step ST18, steering amount calculating element 51 receives the terrain information and estimated state signal $\hat{x}(k/k)$ and calculates and outputs steering amount u(k) which the target in the estimated state is forced to generate by a restriction of terrain. Finally, in a step ST19, system dynamics processing element 206 receives steering amount u(k) and estimated signal x(k/k) and effects calculations in accordance with the following equations:

$$\hat{x}(k+1/k) = \Phi\hat{x}(k/k) + \Gamma u(k) \quad (18)$$

wherein u(k): a steering amount at a time k; and
Γ: an input matrix.

As a result, system dynamics processing element 206 outputs predicted state signal $\hat{x}(k+1/k)$. Then, the process returns to step ST11.

According to the target route predicting apparatus of the second embodiment, a steering amount of a target is calculated on the basis of a restriction of terrain, thereby enabling an efficient route prediction utilizing terrain information.

Figure 9:
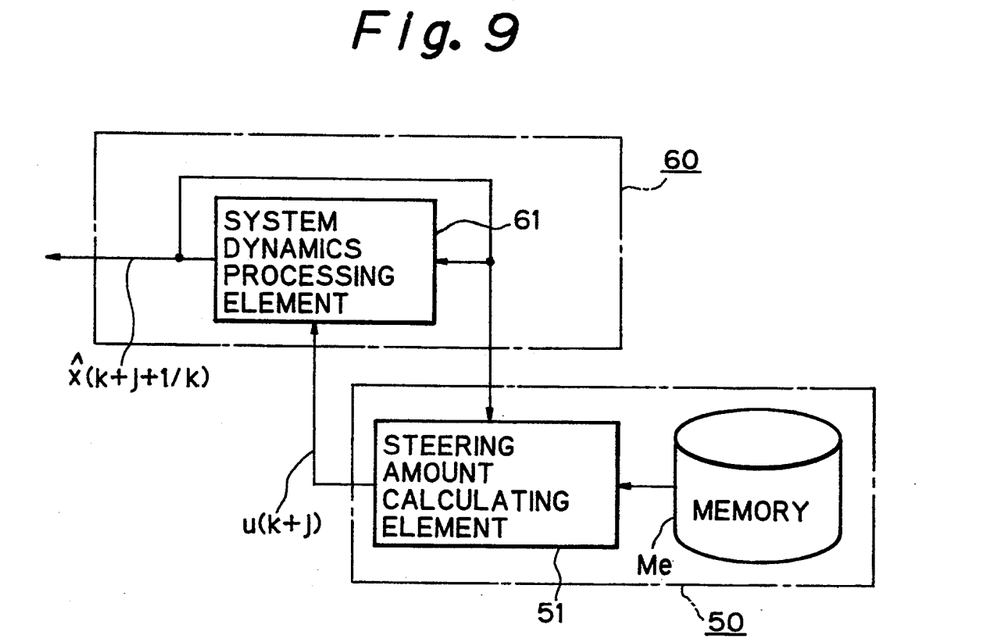
FIG. 9 is a block diagram illustrating the construction of the third embodiment of a target route predicting apparatus according to the present invention.

FIG. 9 shows the construction of the third embodiment of a target route predicting apparatus according to the present invention. This embodiment comprises a combination of steering amount calculating unit 50 including memory Me and steering amount calculating element 51, and a predicting unit 60 including a system dynamics processing element 61.

In FIG. 9, steering amount calculating unit 50 receives a predicted state signal $\hat{x}(k+j+1/k)$ and calculates a steering amount u(k+j) which the target in the predicted state is forced to generate by a restriction of terrain. Prediction unit 60 receives steering amount u(k+j) and updates and outputs predicted state signal $\hat{x}(k+j+1/k)$. Steering amount calculating element 51 in steering amount calculating unit 50 receives the terrain information from memory Me and predicted state signal $\hat{x}(k+j+1/k)$ and calculates and outputs steering amount u(k+j) which the target in the predicted state is forced to generate by a restriction of terrain. System dynamics processing element 61 receives steering amount u(k+j) from steering amount calculating element 51 and a predicted state signal calculated by system dynamics processing element 61 a unit time before and updates and outputs the predicted state signal by a unit time. The predicted state signal will be updated again a unit time later and input to steering amount calculating element 51.

Figure 10:
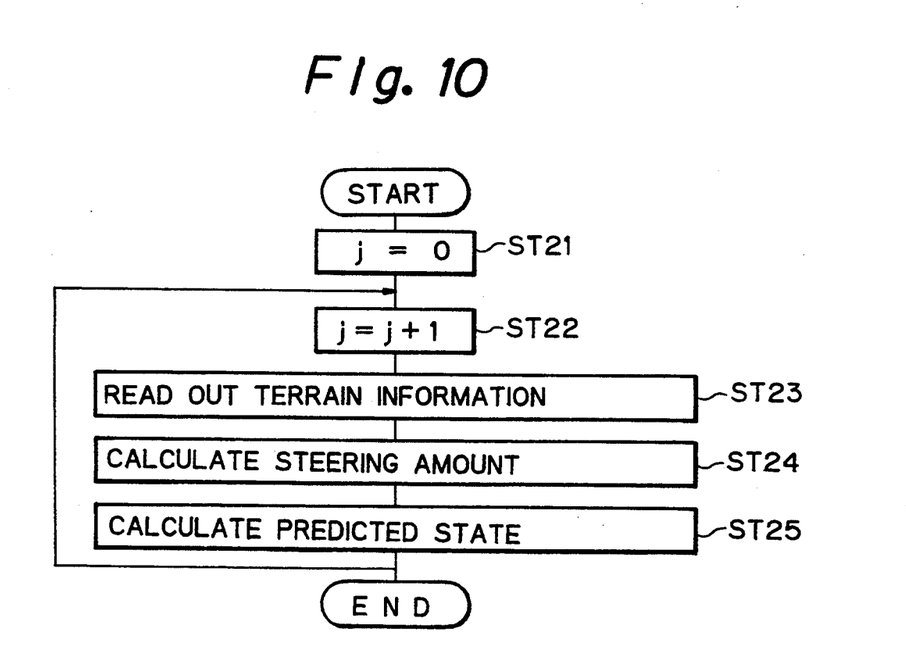
FIG. 10 is a flowchart illustrating the operation of the target route predicting apparatus shown in FIG. 9.

Operation of the target route predicting apparatus shown in FIG. 9 will be described using a flowchart shown in FIG. 10. In a step ST21, j is set to zero. In time (k+j) of FIG. 9, "j=0" indicates a current time and a unit time passes as j is incremented by one. In a step ST22, j is incremented by one. Then, in a step ST23, the terrain information is read out of memory Me. In a step ST24, steering amount calculating element 51 receives the terrain information from memory Me and predicted state signal $\hat{x}(k+j+1/k)$ and calculates and outputs steering amount u(k+j) which the target in the predicted state is forced to generate by a restriction of terrain. Finally, in a step ST25, system dynamics processing element 61 receives steering amount u(k+j) and predicted state signal $\hat{x}(k+j+1/k)$ and effects calculations in accordance with the following equations:

$$\hat{x}(k+j+1/k) = \Phi\hat{x}(k+j/k) + \Gamma u(k+j) \quad (19)$$

Then, system dynamics processing element 61 updates and outputs the predicted state signal by a unit time and the process returned to step ST21.

According to the target route predicting apparatus of the third embodiment, it is possible to predict a route of a target using terrain information even if the target is not observable.

Figure 11:
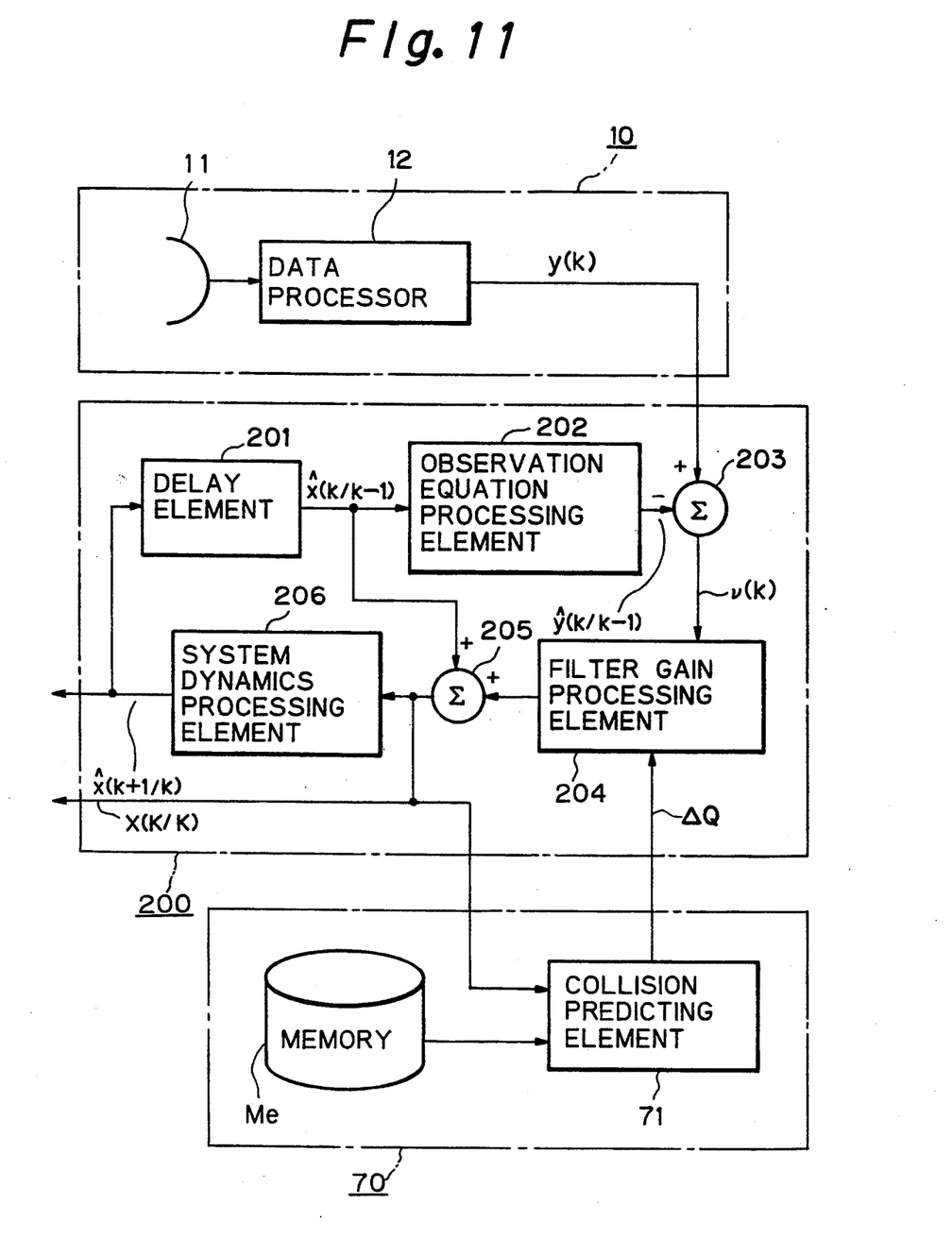
FIG. 11 is a block diagram illustrating the construction of the fourth embodiment of a target route predicting apparatus according to the present invention.

FIG. 11 shows the construction of the fourth embodiment of a target route predicting apparatus according to the present invention. The target route predicting apparatus of this embodiment includes, as a new structural component, a maneuver prediction unit 70 which receives predicted state signal x̂(k/k) from prediction unit 200 and outputs a predicted signal ΔQ representative of a predicted amount of maneuver taken by the target to avoid collision to an obstacle. Predicted signal ΔQ may be an increase in a system noise covariance.

Prediction unit 200 receives observed amount y(k) from observing unit 10 and predicted signal ΔQ from maneuver prediction unit 70 and calculates and outputs estimated state signal x̂(k/k) and predicted state signal x̂(k+1/k) of the target. Maneuver predicting unit 70 comprises a collision predicting element 71 which receives the terrain information from memory Me and estimated state signal x̂(k/k) from prediction unit 200 and predicts a maneuver expected to be taken by the target for the purpose of avoiding collision to an obstacle if the target would fly along the current route and outputs predicted signal ΔQ representing an increase in system noise covariance.

Prediction unit 200 is different from that of the second embodiment in that estimated state signal x̂(k/k) is input to collision predicting element 71, and that filter gain processing element 204 receives predicted signal ΔQ representing an increase in a system noise covariance and output from collision predicting element 71.

Figure 12:
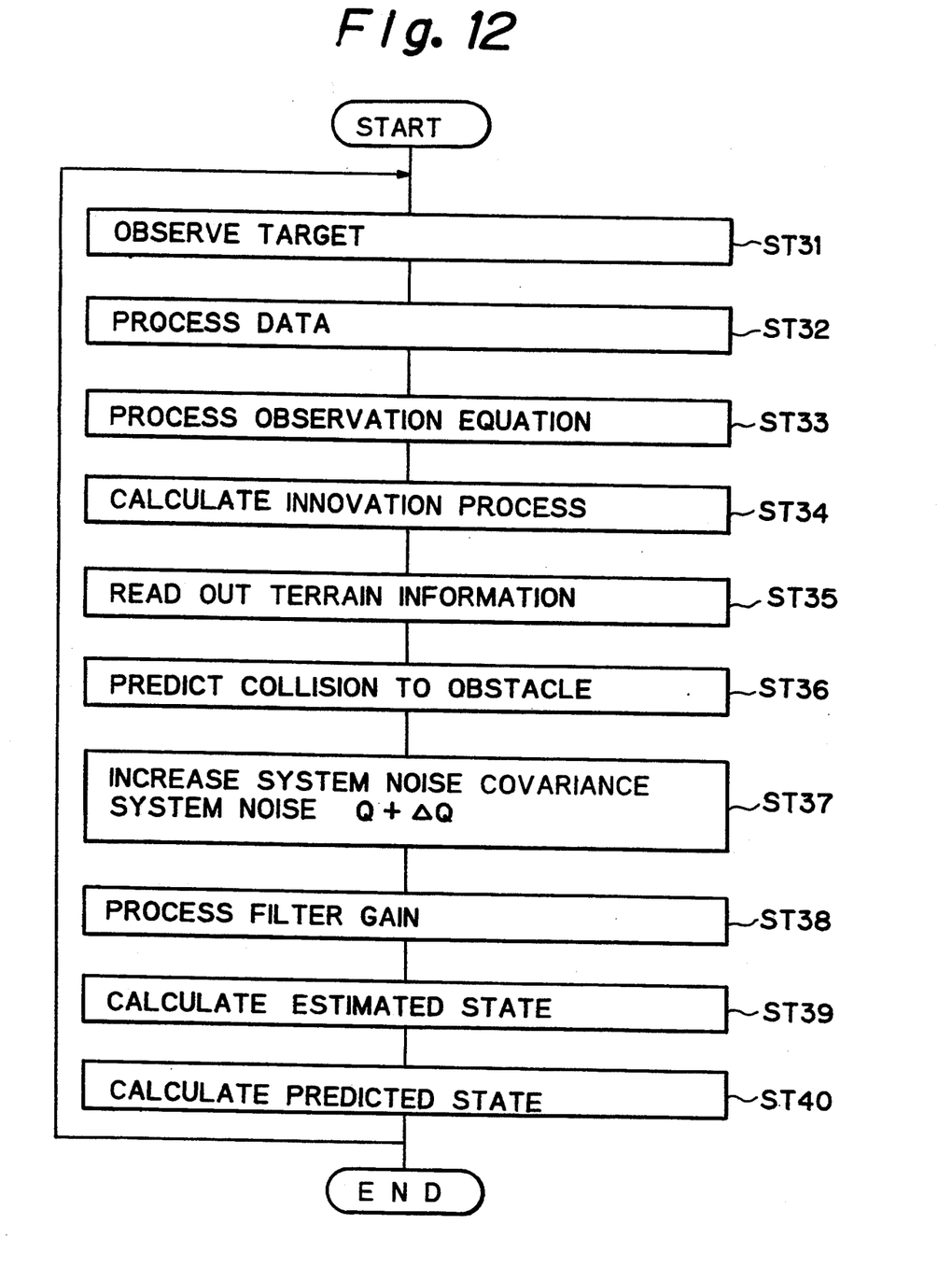
FIG. 12 is a flowchart illustrating the operation of the target route predicting apparatus shown in FIG. 11.

Operation of the target route predicting apparatus of the fourth embodiment will be described using a flowchart shown in FIG. 12. The operations performed in steps ST31–ST34 are similar to those performed in steps ST11–ST14 of the second embodiment. In a step ST35, the terrain information is read out of memory Me. In a step ST36, collision predicting element 71 receives the terrain information from memory Me and estimated state signal x̂(k/k) from prediction unit 200 and predicts a maneuver expected to be taken by the target for the purpose of avoiding collision to an obstacle if the target would fly along the current route and outputs predicted signal ΔQ representing an increase in a system noise covariance. In a step ST37, filter gain processing element 204 adds the increase in system noise covariance to the last covariance. This is expressed in the following equations:

$$Q \rightarrow Q + \Delta Q \quad (20)$$

Since the system noise covariance Q of these equations is a matrix, an increase in system noise covariance is defined by the following equations in an accurate fashion:

$$Q = q \cdot \begin{bmatrix} T^3/3 & T^2/2 \\ T^2/2 & T \end{bmatrix} \quad (21)$$

$$q \rightarrow q + \Delta q \quad (22)$$

The entire matrix has a scalar q as a coefficient and this scalar q is increased. Subsequently, operations similar to those performed in the prior art target route apparatus are performed in steps ST38–ST40.

According to the target route predicting apparatus of the fourth embodiment, a maneuver taken by a target to avoid collision to an obstacle is predicted, thereby enabling an efficient route prediction utilizing terrain information.

Although the present invention has been described in detail with reference to an embodiment, the present invention is not limited thereto, and a variety of modifications and changes are possible without departing from the scope and spirits of the invention. For example, an infrared sensor or the like may be effectively employed as the sensor 11 in place of a radar. Also, while a neural network is employed for the learning adjustment unit 40, another learning method or adaptive method such as a sequential identification method can be utilized.

Further, although, in the above embodiment, fuzzy inference is employed for deriving a predicted observed value, an artificial intelligence device may be alternatively utilized for the same purpose.

What is claimed is:

1. An apparatus for predicting a predicted route of a target, comprising:
    an observing unit for observing the target, having means for determining if the target is observable and means for providing an observed route value of an actual route of said target;
    terrain information means for providing characteristic parameters of prestored terrain information; and
    a predicting unit, coupled to receive said observed route value and said characteristic parameters, having means for inferring the predicted route according to a first and a second mode,
        in which the means for inferring operates according to the first mode, when the means for determining determines that the target is observable, and infers the predicted route on the basis of the observed route value and the characteristic parameters and
        in which the means for inferring operates according to the second mode, when the means for determining determines that the target is unobservable, and infers the predicted route on the basis of a prior predicted route and the characteristic parameters.

2. The apparatus according to claim 1, wherein said means for inferring includes means for adjusting the inference in response to an adjusting signal and wherein said predicting unit further comprises:
    delay means, receiving the predicted route, for delaying the predicted route by a unit time to output a delayed predicted route
    subtracting means, coupled to receive the delayed predicted route and the observed route value, for providing an error signal that is indicative of an accuracy of the predicted route in comparison to the actual route; and
    neural network means, receiving the error signal, for providing the adjusting signal so that the means for inferring gradually improves the accuracy.

3. The apparatus according to claim 2, wherein said terrain information means includes a memory for prestoring said terrain information and an extracting means for extracting the characteristic parameters of the terrain information from said memory.

4. An apparatus for predicting a predicted state of a target for a unit time later than the current time, comprising:
    an observing unit having a sensor for observing the target and having a processor processing signals from the sensor to provide an observed value indicative of an actual route of the target;

memory means for prestoring terrain information;

calculating means, responsive to the terrain information and an estimated state of the target for the current time, for calculating a steering amount of the target, the steering amount being indicative of the amount of steering the target is forced to generate in the estimated state because of a restriction of terrain as indicated by the terrain information; and predicting means, responsive to the observed value and the steering amount, for providing the estimated state of said target for the current time and the predicted state of said target at said unit time later than the current time.

5. The apparatus as claimed in claim 4 wherein said predicting means comprises:

means, responsive to the predicted state of said target, for outputting a predicted observed value;

means, responsive to the observed value and the predicted observed value, for outputting the estimated state of the target for the current time; and means, responsive to the estimated state of the target and the steering amount, for outputting the predicted state.

6. An apparatus for predicting a predicted state of a target at a unit time later than the current time, comprising:

an observing unit having a sensor for observing the target and having a processor processing signals from the sensor to provide an observed value indicative of an actual route of the target;

memory means for prestoring terrain information;

calculating means, responsive to the terrain information from said memory means and a predicted state of said target for the current time, for calculating a steering amount of said target, the steering amount being indicative of the amount of steering the target is forced to generate in the predicted state for the current time because of a restriction of terrain as indicated by the terrain information; and predicting means, responsive to the steering amount, the observed value and the predicted state for the current time, for outputting the predicted state of said target for said unit time later than the current time.

7. An apparatus for predicting a predicted state of a target at a unit time later than the current time, comprising:

an observing unit having a sensor for observing the target and having a processor processing signals from the sensor to provide an observed value indicative of an actual route of the target;

memory means for prestoring terrain information;

first predicting means, responsive to the terrain information from said memory means and an estimated current state of said target, for outputting a maneuver signal representative of a predicted amount of maneuver necessary by said target for the purpose of avoiding collision to an obstacle as indicated by the terrain information; and second predicting means, responsive to the observed value from said observing means and the maneuver signal from said first predicting means, for providing the estimated state of said target and the predicted state of said target at said unit time later than the current time.

8. The apparatus as claimed in claim 7 wherein said second predicting means comprises:

means, responsive to the predicted state of said target, for outputting a predicted observed value;

means, responsive to the observed value and the predicted observed value, for outputting the estimated state of said target; and means, responsive to the estimated state of said target, for outputting the predicted state at said unit time later than the current time.

9. An apparatus for predicting a route of a target for a unit time later than the current time, comprising:

an observing unit having a sensor for observing the target and having a processor for processing signals from the sensor to provide an observed value indicative of an actual route of the target;

a terrain information unit having a memory with terrain information stored therein and a means for extracting characteristic parameters from the terrain information stored in the memory; and a predicting unit having a means for inferring and a means for adjusting, the means for inferring, including a fuzzy inferring element, receiving the characteristic parameters, an adjusting signal from the means for adjusting, the observed value, and a predicted route value for the current time, the fuzzy inferring element operating according to one of a first and a second mode in response to whether the observing unit is able to observe the target, in which in the first mode, the fuzzy inferring element infers the predicted route value of the target for said unit time later than the current time on the basis of the observed value, the adjusting signal, and the characteristic parameters, and in which in the second mode, the fuzzy inferring element infers the predicted route value of the target for said unit time later than the current time on the basis of the characteristic parameters and the predicted route value of the target for the current time, wherein the first mode corresponds to the target being observable and the second mode corresponds to the target being unobservable, by the observing unit and a delay element for storing for one time unit the predicted route value of the target for said unit time later than the current time and for providing a delayed predicted route value, and the means for adjusting, including a subtraction element, receiving the delayed predicted route value and the observed value, for providing an error signal indicative of the accuracy of the inference performed by the means for inferring at said unit time prior to the current time, and a neural network receiving the error signal and producing therefrom the adjusting signal so as to gradually improve the accuracy over time.

* * * * *